(12) United States Patent
Okayama

(10) Patent No.: US 6,665,467 B2
(45) Date of Patent: Dec. 16, 2003

(54) OPTICAL WAVELENGTH FILTER

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 194 days.

(21) Appl. No.: 09/812,685

(22) Filed: Mar. 21, 2001

(65) Prior Publication Data

US 2002/0015555 A1 Feb. 7, 2002

(30) Foreign Application Priority Data

Jul. 12, 2000 (JP) .................................... 2000-211653

(51) Int. Cl.[7] .................................................. G02B 6/26
(52) U.S. Cl. .............................. 385/28; 385/37; 385/42; 385/45
(58) Field of Search ............................... 385/24, 28, 37, 385/46, 11, 16, 122, 14, 31, 15, 17, 18, 42, 43, 131, 132

(56) References Cited

U.S. PATENT DOCUMENTS 5,901,259 A * 5/1999 Ando et al. ................ 385/16

FOREIGN PATENT DOCUMENTS

JP  7-89183  11/1990

OTHER PUBLICATIONS

Raman Kashyap "A simplified approach to the Bragg grating based Michelson and the in-coupler Bragg grating add-drop multiplexer" (Optical Fiber Communication OFC'99, TuN 3-1).

* cited by examiner

Primary Examiner—Frank G. Font
Assistant Examiner—Michael P. Mooney
(74) Attorney, Agent, or Firm—Volentine Francos, PLLC

(57) ABSTRACT

An optical wavelength filter having an optical coupler, for suppressing the generation of a double peak caused by a difference of propagation constants between intrinsic modes of light in an optical coupler. The optical wavelength filter includes first and second optical couplers for exciting multiple modes of light in each wavelength of WDM light and providing a phase difference of p/2 between different modes of multiple modes of light, and a mode converter provided between the first and second optical couplers. The mode converter performs mode conversion between the modes of light belonging to a specific wavelength, whereby the phase difference of each mode of light constituting the light of a specific wavelength, and the phase difference between the modes of light constituting the light of another wavelength, are independently adjusted so as to output light of a specific wavelength and light of another wavelength from separate output ports.

12 Claims, 10 Drawing Sheets

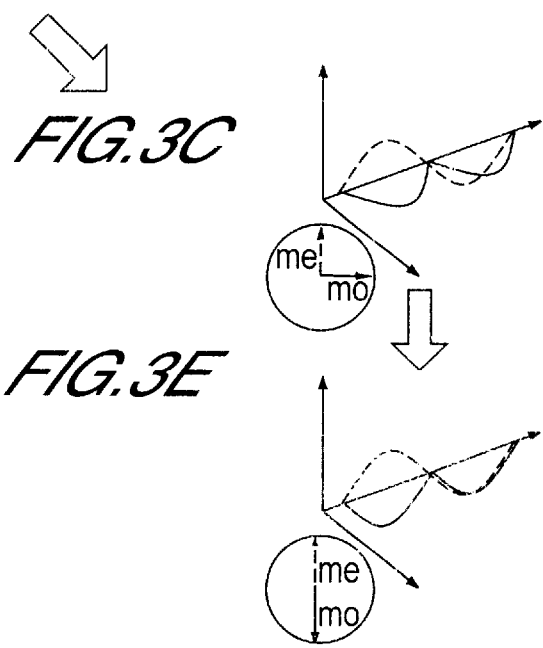

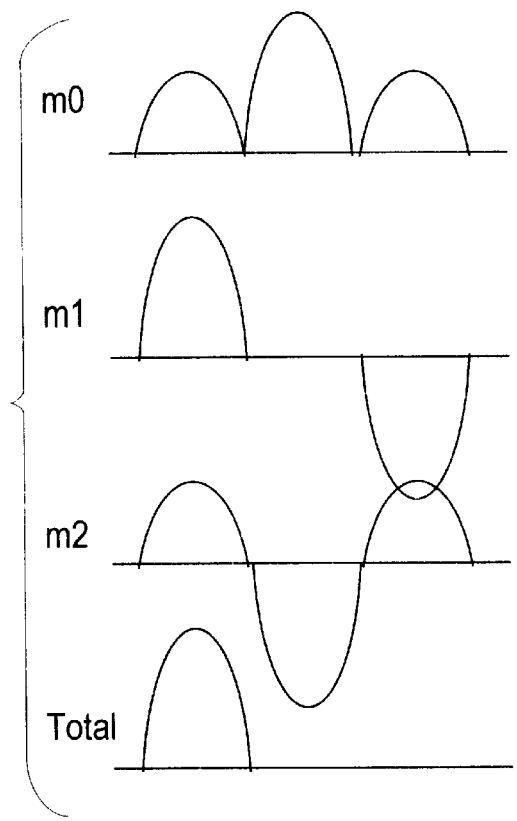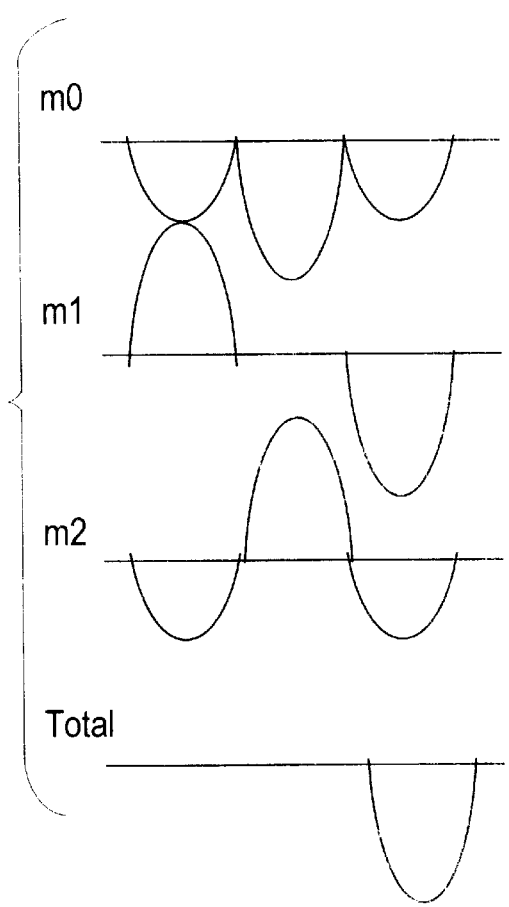

FIG. 12A
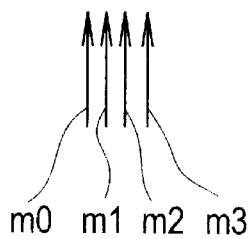
⇓
FIG. 12B
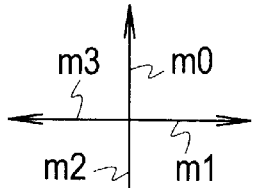
⇘         ⇓
FIG. 12D                    FIG. 12C
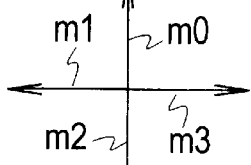        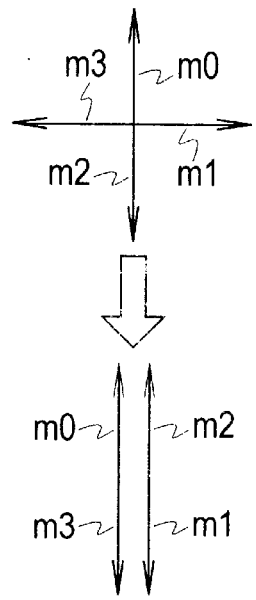
⇓
FIG. 12F        FIG. 12E
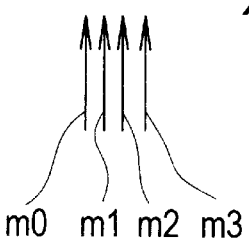

OPTICAL WAVELENGTH FILTER

BACKGROUND OF THE INVENTION

1. Field of the Invention

The present invention relates to an optical wavelength filter.

2. Description of Related Art

Conventionally, an optical wavelength filter, which selectively outputs light of a specific wavelength from light entered into a Mach-Zehnder optical element having a diffraction grating, was utilized. In Document I (Optical Fiber Communication (OFC'99) TuN 3-1), an optical add-drop element is disclosed as an example thereof.

The optical add-drop element disclosed in Document I has either one or more optical couplers and a diffraction grating in each of a plurality of parallel optical waveguides. The diffraction grating either, for example, is disposed inside one optical coupler like the Bragg reflecting coupler shown in FIG. 4 of Document I, or, for example, is disposed on two arms between two optical couplers as in the bandpass filter having a Michelson-Bragg diffraction grating shown in FIG. 1 of Document I.

With such an optical add-drop element, by making light of a specific wavelength incident upon the diffraction grating, it is possible either to drop (to make wavelength division demultiplexing) light of a specific wavelength from the incident light, or to add (to make wavelength division multiplexing) light of a specific wavelength to the incident light.

However, in the optical add-drop element of Document I, the problem is that since the light propagating in the optical coupler ordinarily becomes a propagation light of a high-order mode comprising a plurality of specific (or intrinsic) modes, this gives rise to differences in the propagation constant between the specific modes, and the wavelengths reflected on the diffraction grating will differ for each mode.

That is, when wavelength division multiplexing light (WDM light or WDM optical signal) is made incident on the optical add-drop element, for example, whereas ideally single peak output light having a peak in only one specific wavelength should be selectively outputted, because the reflected wavelength selected in the grating differs for each mode, double peak output light having peaks in a plurality of barely separate wavelengths is outputted.

Further, as disclosed in Document II (Japanese Patent Publication No. 7-89183 (Japanese Patent No. 2053167)), if an optical coupler is constituted such that only one specific mode is excited, this kind of problem does not occur, but, in this case, the optical coupler must be constituted from an asymmetrical branching waveguide.

However, in this asymmetrical branching waveguide, since it is necessary to reduce the branching angle, for example, to around 0.1 μrad, and to quasi-statically change the structure relative to the direction of propagation of the light, the length of the element inevitably becomes longer, and as a result thereof, it was impossible to realize a more compact optical wavelength filter.

SUMMARY OF THE INVENTION

Therefore, an object of the present invention is to provide an optical wavelength filter, which is capable of suppressing the generation of double peaks caused by differences in the propagation constant between specific modes in an optical coupler.

Another object of the present invention is to provide an optical wavelength filter which, more preferably, is capable of suppressing the generation of double peaks without increasing the length of the filter.

Accordingly, an optical wavelength filter of the present invention comprises a first and second optical coupler and a mode converter. Each of the optical couplers propagate wavelength division multiplexing (WDM) light comprising a plurality of light components with different wavelengths, excite multiple modes of light including high-order mode light for each wavelength of light of the WDM light, and provide a predetermined phase difference between different modes of the multiple modes of light. The mode converter is arranged between the first and second optical coupler, and performs mode conversion between modes of different orders of a specific wavelength selected upon request from among the multiple modes of light excited by the optical couplers.

According to this constitution, because mode conversion is performed between modes of different orders of a specific wavelength selected as desired from among the multiple modes of light excited by the optical couplers, it is possible to adjust the phase difference between modes of light belonging to a specific wavelength of light independently from the phase difference between modes of light belonging to another wavelength of light. Accordingly, it is possible to output only light of a specific wavelength from an output or exit port separate from that for light of another wavelength. Since mode conversion is performed between modes of light belonging to a specific wavelength, it is possible to suppress the generation of double peaks that is caused by the difference in propagation constant for each mode of light in a specific wavelength.

Note that mode conversion in a mode converter signifies mode conversion between at the least modes of different orders. However, in addition thereto, there can also be cases in which mode conversion is performed for reflection and so forth.

Further, in an embodiment of the present invention, preferably a first optical coupler has a first input port for inputting WDM light thereto, and a first optical coupling region for exciting the multiple modes of light of the WDM light inputted from the first input port thereof, and in the optical coupling region, a phase difference of substantially $\pm\pi/2$ is provided between the modes of light belonging to each wavelength of light, and a mode converter performs the mode conversion described hereinabove while generally maintaining the phase difference between the modes of light outputted from the first optical coupler, and a second optical coupler has a second optical coupling region for enabling the propagation of multiple modes of light, and a first output port and a second output port, and in this second optical coupling region, once again a phase difference of substantially $\pm\pi/2$ is provided between the modes of light belonging to each wavelength of light outputted from the mode converter, and in accordance therewith, the light of a specific wavelength and other light can be outputted from either the first or second output ports, which differ from one another.

By so doing, from among the modes of light constituting WDM light inputted to this optical wavelength filter, a phase difference of either $\pi$ or $-\pi$ can be provided between the modes of light belonging to a specific wavelength, and a phase difference of either $-\pi$ or $\pi$ (double signs in same order) can be provided between the modes of light belonging to other wavelengths. That is, it is enabled to output the light of a specific wavelength and the light of other wavelengths from different output ports.

Furthermore, in the first optical coupler, second optical coupler and mode converter, a phase difference, which is either granted or maintained may be considered in a range from $-\pi$ to $\pi$ in accordance with periodicity of $2\pi$ for each mode of light.

Further, according to an optical wavelength filter of the present invention, because a first and second optical coupler can be formed by a coupler having a symmetrical branching structure, there is no need to utilize such an asymmetrical branching waveguide as disclosed in Document II, and as a result thereof, the element length of the optical wavelength filter can be shortened.

Further, in another preferable embodiment of the present invention, multiple modes of light excited by the first and second optical couplers may be made zero-order mode light and first-order mode light, and in that case, mode conversion in the mode converter can be performed between a zero-order mode light and a first-order mode light each constituting a specific wavelength of light. That is, an optical wavelength filter may be constituted as a 2-mode system, which utilizes two modes of light.

Further, in another embodiment of the present invention, it is preferable that multiple modes of light excited by the first and second optical couplers may be made zero-order mode light, first-order mode light and second-order mode light, and, in that case, mode conversion in the mode converter may be performed between a zero-order mode light and a second-order mode light, both constituting (or belonging to) a specific wavelength of light.

In a still another embodiment of the present invention, it is preferable that multiple modes of light excited by the first and second optical couplers may be zero-order mode light, first-order mode light, second-order mode light and third-order mode light, and in this case, mode conversion in the mode converter may be performed between either one of a zero-order mode light and a second-order mode light, or a first-order mode light and a third-order mode light, constituting (or belonging to) a specific wavelength light.

Thus, when constituted as a 3-mode system comprising zero- through second-order modes of light, or as a 4-mode system comprising zero- through third-order modes of light, or as a mode system of orders thereabove, since crosstalk light becomes apt to form a radiating mode in the output-side optical coupler, it is possible to reduce unnecessary crosstalk light.

Typically, a mode converter has a multimode waveguide, and a plurality of rows of diffraction gratings. The diffraction gratings are provided in the multimode waveguide so as to form a periodic structure along the optical wave guiding direction in the multimode waveguide, and such that the rows extend in parallel while being mutually staggered by a half period.

A mode converter may be constituted by a multimode waveguide as mentioned above. Accordingly, a mode converter may also be constituted from a plurality of single-mode waveguides as will be described hereinbelow. Specifically, a mode converter, for example, may also have a plurality of single-mode waveguides arranged in parallel, and a plurality of rows of diffraction gratings. The diffraction gratings are provided in the respective single-mode waveguides so as to form a periodic structure along the optical wave guiding direction, and such that the rows extend in parallel while being mutually staggered by a half period.

BRIEF DESCRIPTION OF THE DRAWINGS

The foregoing and other objects, features and advantages of the present invention will be better understood from the following description taken in connection with accompanying drawings, in which:

FIG. 6 is diagrams schematically showing each mode of a 3-mode optical wavelength filter according to a second embodiment of the present invention;

FIG. 12 is diagrams schematically showing the phase difference between the modes of light in each portion in a 4-mode optical wavelength filter (odd mode conversion) according to a third embodiment of the present invention.

DESCRIPTION OF THE PREFERRED EMBODIMENTS

With reference to drawings, a detailed description will be hereinafter given to embodiments of an optical wavelength filter according to the present invention. Furthermore, in each drawing utilized in this explanation, the size, shape and arrangement relationship of each constitutional element are simply shown schematically to the extent necessary to be able to understand these inventions. Further, there are cases in which the same numerals will be given to the same constitutional elements in each drawing, and duplicate explanations thereof will be omitted.

Common Concepts to Each Embodiment

Figure 1:
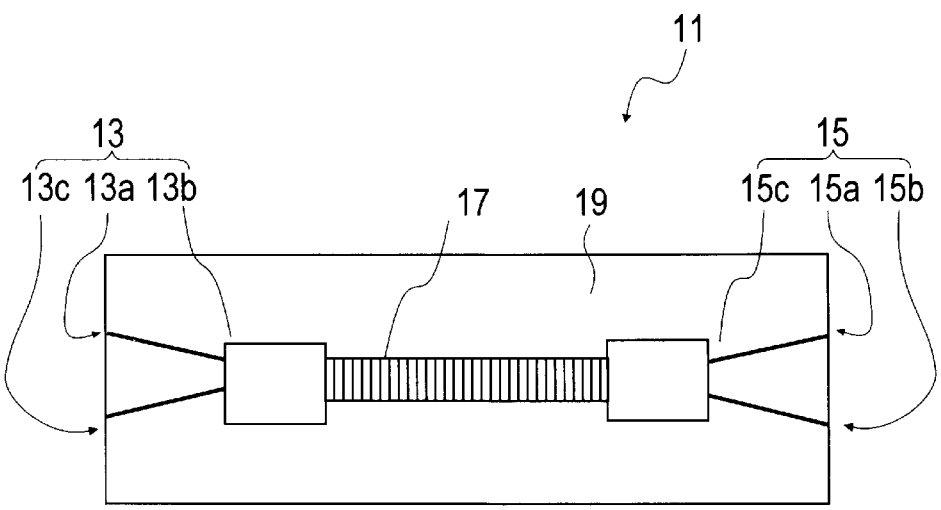
FIG. 1 is a diagram showing an example of a conceptual constitution of an optical wavelength filter according to the present invention.

FIG. 1 is a diagram showing a conceptual constitution of an optical wavelength filter according to the present invention. Hereinbelow, firstly, the conceptual constitutions of embodiments of the optical wavelength filters will be explained by referring to FIG. 1, and other optical wavelength filters of a first and second embodiment will be explained.

As shown in FIG. 1, an optical wavelength filter 11 comprises a first optical coupler 13, a second optical coupler 15, and a mode converter 17 arranged or provided between the first optical coupler 13 and the second optical coupler 15.

Furthermore, the optical wavelength filter 11 shown in FIG. 1, has waveguide elements such as the optical couplers 13 and 15 and mode converter 17 formed in the substrate 19. However, an optical wavelength filter having waveguide elements formed in the optical fiber configuration will not particularly need such substrate 19 as a filter constituent.

The first optical coupler 13 and second optical coupler 15 have functions for propagating wavelength division multiplexing (WDM) light (or WDM optical signal) comprising a plurality of wavelengths. The couplers 13 and 15 excite the light of each wavelength of the WDM light to generate multiple modes of light. The generated multiple modes of light comprising high-order modes of light. Furthermore, the couplers 13 and 15 provide a predetermined phase difference between different modes of the multiple modes of light.

For example, the first optical coupler 13 and second optical coupler 15 are couplers (multimode excitation couplers) capable of exciting multiple modes of light. These optical couplers can be constituted either from a multimode waveguide, or a plurality of single-mode waveguides, which are arranged in parallel, and close enough to one another for optical coupling to occur.

The optical wavelength filter 11 can be made to function such that, for example, a light of a specific wavelength is split or demultiplexed from the WDM light incoming to the first optical coupler 13.

For example, the first optical coupler 13 has a first input port 13a for inputting WDM light and a first optical coupling region 13b for exciting the multiple modes of light of the WDM light inputted from the first input port 13a. The first optical coupling region 13b has a function for providing a $\pm\pi/2+2\,m\pi$ (where m is an integer) phase difference between the plurality of modes of light constituting each wavelength of light in the WDM light. Further, the first optical coupler 13 of the example shown in FIG. 1 has a dummy port 13c, and there are cases in which the dummy port 13c is used appropriately in accordance with a design.

Further, the second optical coupler 15, for example, has a first output port 15a, a second output port 15b, and a second optical coupling region 15c, which is capable of propagating multiple modes of light similar to the multiple modes of light generated by the first optical coupler 13. This second optical coupling region 15c has functions for further providing a $\pm\pi/2+2\,n\pi$ (where n is an integer) phase difference between the modes of light outputted from the mode converter 17, whereby light of a specific wavelength is outputted from the first output port 15a, while light of the other wavelengths is outputted from the second output port 15b.

A 3 dB coupler constituted by a multimode waveguide or a plurality of single-mode waveguides can be utilized as a first optical coupler 13 and a second optical coupler 15. In other words, as for optical wavelength filter 11 of the embodiment, first optical coupler 13 and second optical coupler 15 may have a symmetrical branching structure differently from an asymmetrical branching waveguide as disclosed in Document II, as that the couplers, can be constituted from branching waveguides that excite the same high-order modes of light. Accordingly, optical wavelength filter 11 of the embodiment does not require an asymmetrical branching waveguide such as that disclosed in Document II, and consequently, is capable of making the length of the element shorter than the constitution of that disclosed in Document II.

The mode converter 17 is disposed or arranged between a first optical coupler 13 and a second optical coupler 15, and is constituted so as to perform mode conversion between modes of different orders of light belonging to a specific wavelength of light selected as desired from among multiple modes of light excited by the first optical coupler 13 and the second optical coupler 15.

The mode converter 17 may be constituted from either one multimode waveguide, or a plurality of single-mode waveguides, as will be explained for each embodiment described hereinbelow.

In mode conversion in the mode converter 17, when high-order modes of light are inputted, mode conversion is performed between a first intrinsic or specific mode of light and a second intrinsic or specific mode of light from among the lower-order of light than that high-order modes of light. In order to perform mode conversion such as this efficiently, the mode converter 17 can be designed such that the change in the dielectric constant in parts or portions in which the overlapping of amplitudes of the first and second intrinsic modes of light is great.

The mode converter 17 performs mode conversion while maintaining the phase differences between the modes of light of the plurality of modes of light outputted from the first optical coupler 13 in the state outputted from the first optical coupler 13.

With the optical wavelength filter 11 such as this, mode conversion can be performed only between specific modes of light belonging to a specific wavelength from among the wavelengths of the WDM light. As is known, the light of each wavelength is expressed as the sum of the modes of light belonging to the wavelength. By making use thereof, a waveform, which is given as the sum of modes of light constituting light of a specific wavelength, can form a peak in a location that differs from a waveform, which is given as the sum of modes of light constituting light of other wavelengths, by making the phase difference between the modes of light constituting the light of a specific wavelength differ from the phase difference between the modes of light constituting the light of other wavelengths. Therefore, only light of a specific wavelength can be outputted from an output port separate from that of the light of other wavelengths.

Further, since mode conversion is carried out at this time between multiple modes of light constituting the light of a specific wavelength, it is possible to effectively suppress the generation of double peaks in proximity to a specific wavelength, which causes the propagation constant of each mode of light to differ.

First Embodiment

Figure 2:
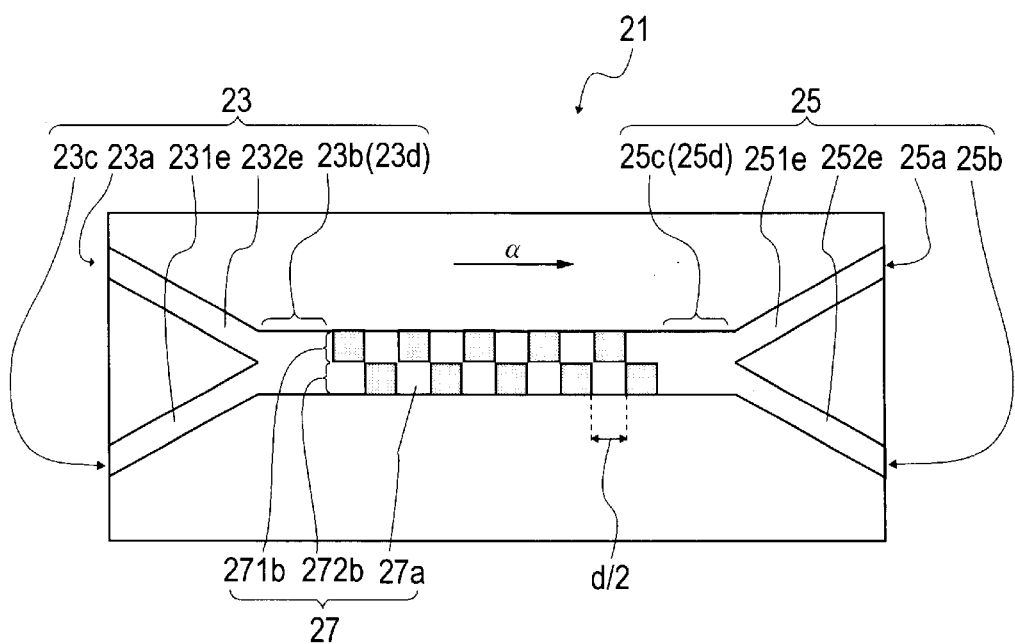
FIG. 2 is a diagram showing a first embodiment of an optical wavelength filter according to the present invention, and more particularly, is a diagram showing a simplified constitution of a 2-mode optical wavelength filter.

FIG. 2 is an example of a constitution of the optical wavelength filter of FIG. 1, and is a diagram showing a simplified constitution of an optical wavelength filter according to a first embodiment of the present invention. In FIG. 2, there is shown one aspect of a 2-mode optical wavelength filter, which uses a zero-mode of light and a first-mode of light.

As shown in FIG. 2, an optical wavelength filter 21 comprises a first optical coupler 23, a second optical coupler 25 that is similar to the first optical coupler 23, and a mode converter 27. However, the mode converter 27 of the first embodiment is constituted from one multimode waveguide.

The first optical coupler 23 has a first input port 23a for inputting WDM light, and a first optical coupling region 23b for exciting the zero-order and first-order modes of light of the WDM light inputted from the first input port 23a. The first optical coupling region 23b has a function for providing a $\pm \pi/2 + 2$ m$\pi$ (where m is an integer) phase difference between a plurality of modes of light constituting each wavelength of light in the WDM light. More specifically, the first optical coupler 23 is constituted from one multimode waveguide 23d, which forms the first optical coupling region 23b, and two branching waveguides (single-mode waveguides) 231e and 232e, which are smoothly connected to the multimode waveguide 23d, and have a symmetrical Y branching structure. Furthermore, the first optical coupler 23 may preferably have a dummy port 23c as in the example shown in the FIG. 2.

Further, the second optical coupler 25 has a first output port 25a, a second output port 25b, and a second optical coupling region 25c, which is capable of propagating multiple modes of light of the same orders (zero-order and first-order) as the multiple modes of light generated by the first optical coupler 23. The second optical coupling region 25c has functions for further providing a $\pm \pi/2 + 2$ n$\pi$ (where n is an integer) phase difference between the modes of light outputted from the mode converter 27, and in accordance therewith, light of a specific wavelength is outputted from, for example, the first output port 25a, while light of other wavelengths is outputted from, for example, the second output port 25b. More specifically, the second optical coupler 25 is constituted from one multimode waveguide 25d, which forms the second optical coupling region 25c, and two branching waveguides (single-mode waveguides) 251e and 252e, which are smoothly connected to the multimode waveguide 25d, and have a symmetrical Y branching structure.

The mode converter 27 performs mode conversion, while maintaining the phase differences between the modes of light of the plurality of modes of light outputted from the first optical coupler 23 in the state outputted from the first optical coupler 23.

Further, as shown in FIG. 2, when constituted from one multimode waveguide, the mode converter 27 has a multimode waveguide 27a and two rows of diffraction gratings 271b and 272b. The gratings 271b and 272b are provided in the multimode waveguide 27a so as to form a periodic structure along the optical waveguiding direction (that is, the mode propagation direction) a, and such that the rows extend in parallel while being mutually staggered by a half period d/2. As a whole, the mode converter 27 has a structure, which imparts a refractive index distribution of a zigzag grating shape to the multimode waveguide 27a.

As shown in FIG. 2, the first optical coupling region 23b and second optical coupling region 25c in the optical wavelength filter 21 are constituted from multimode waveguides 23d and 25d, respectively. The multimode waveguides 23d and 25d are linked to the multimode waveguide 27a of the mode converter 27, and have the same waveguide sectional structure. Therefore, these multimode waveguides 23d, 25d and 27a are ordinarily formed together as a single waveguide.

Furthermore, the refraction gratings 271b and 272b of the mode converter 27 can be configured as either a refractive index modulation type or as a relief type, but when formed as a relief type, it is desirable that they may be formed via the same process as the multimode waveguides 23d and 25d. Further, the mode converter 27 may carry out mode conversion via either an electro-optical effect or an acousto-optical effect.

Here, the operation and specific functions of this optical wavelength filter will be explained by referring to FIG. 2 and FIG. 3.

FIG. 3 is diagrams schematically showing the phase difference between modes of light in each part of an optical wavelength filter. The solid line and broken line of FIG. 3 depict a zero-order mode light mo and a first-order mode light me, and a thick white arrow in the figure depicts a state in which the phasing plane in different parts or portions inside an optical wavelength filter rotates within a complex plane (R-i plane). Furthermore, assume here that the phase difference between modes of light can be substituted in a range from $-\pi$ to $\pi$ in accordance with the $2\pi$ periodicity of each mode light.

It is supposed that a wavelength division multiplexing (WDM) light (optical signals) was inputted to the first input port 23a of the optical wavelength filter 23 shown in FIG. 2. Here, the inputting of a WDM light (optical signals) comprising wavelengths $\lambda_1 - \lambda_N$ is assumed.

Now assume that light inputted to the first input port 23a of the first optical coupler 23 enters into the first optical coupling region 23b, which excites multiple modes of light therein. In the state shown in FIG. 3(A), that is, in a state in which there is no phase difference between multiple modes of light. The inputted light is propagated as a zero-order mode light mo and a first-order mode light me within the first optical coupling region 23b.

Generally speaking, because the propagation constant will differ for different mode orders, when light propagates through the first optical coupling region 23b, a phase difference occurs between a zero-order mode light mo and a first-order mode light me. Here, considering the above mentioned phenomenon, the coupling length of the first optical coupling region 23b is set beforehand such that a phase difference of $\pi/2$ occurs in the output end face of the first optical coupler 23 between a zero-order mode light mo and a first-order mode light me for light of each wavelength $\lambda_1 - \lambda_N$.

Figure 3A:
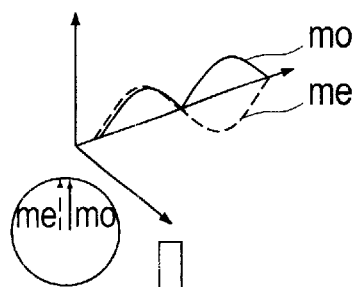
FIG. 3 is diagrams schematically showing the phase difference between the modes of light in each portion in an optical wavelength filter according to a first embodiment of the present invention.
Figure 3B:
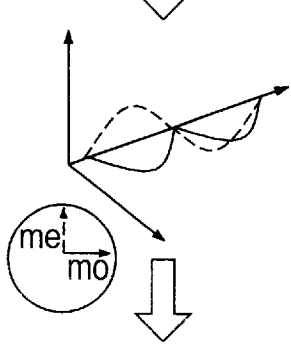
Figure 3D:
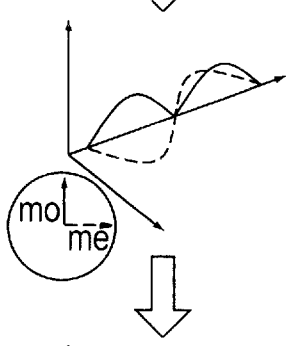

Thus, as shown in FIG. 3(B), a phase difference of $\pi/2$ is granted between the zero-order mode light mo and first-order mode light me constituting the light outputted from the first optical coupler 23, that is, the light of each wavelength $\pi_1 - \lambda_N$.

When the light outputted from the first optical coupler 23 enters the mode converter 27, this light is subjected to mode conversion between specific modes of light of a specific wavelength $\lambda_K$ (provided that K is 1-n) from among the WDM light $\lambda_1 - \lambda_N$. The mode conversion depends on the structure of the refraction gratings 271b and 272b of the mode converter 27.

The mode converter 27 is constituted such that mode conversion occurs only between a zero-order mode light mo and a first-order mode light me of a specific wavelength $\lambda_K$ from among a WDM light $\lambda_1 - \lambda_N$. Therefore, a zero-order mode light mo and a first-order mode light me of a specific wavelength $\lambda_K$ undergo mode conversion when propagating through the mode converter 27, and, as is shown in FIG. 3 (D), are outputted from the output end face of the mode converter 27 in a state having a phase difference of $-\pi/2$.

Conversely, light that does not undergo mode conversion (here, modes of light other than a zero-order mode light mo and a first-order mode light me of a specific wavelength $\lambda_K$) is propagated through the mode converter 27 without undergoing mode conversion, and, as is shown in FIG. 3(C), is outputted at the output end face of the mode converter 27 in a state, which maintains as-is the phase difference in the input end face of the mode converter 27, that is, which mutually maintain a phase difference of $\pi/2$.

Light outputted from the mode converter 27 enters the second optical coupler 25, and propagates through the second optical coupling region 25c of the second optical coupler 25, and thereafter, is outputted from the output end face of the second optical coupler 25, that is, from the first output port 25a and second output port 25b. That is, at the first output port 25a and second output port 25b, a phase difference of $\pi/2$ is once again granted between each zero-order mode light mo and first-order mode light me constituting the light of each wavelength $\lambda_1-\lambda_N$.

Figure 3F:
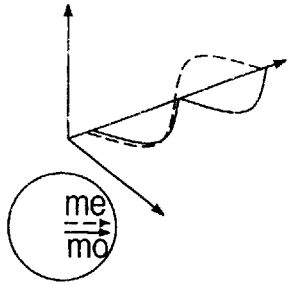

That is, as shown in FIG. 3(F), light of each mode constituting light of a specific wavelength $\lambda_K$ inputted from the mode converter 27 is outputted from the output end face of the second optical coupler 25 in a state, wherein $\pi/2-\pi/2=0$, that is, having no phase difference. Conversely, as shown in FIG. 3(E), modes of light belonging to a wavelengths other than the specific wavelength $\lambda_K$ inputted from the mode converter 27 is outputted from the output end face of the second optical coupler 25 in a state having a phase difference of $\pi/2+\pi/2=\pi$.

Therefore, a waveform of the light of a specific wavelength $\pi_K$ given as the sum of each mode of light constituting light of the specific wavelength $\pi_K$ at the output end face of the second optical coupler 25, has a peak in the first output port 25a side as shown in FIG. 3(F), and light of the specific wavelength $\lambda_K$ is outputted from the first output port 25a. Further, a waveform of light other than light of a specific wavelength $\pi_K$ from among WDM light $\lambda_1-\lambda_N$, has a peak at the second output port 25b side as shown in FIG. 3(E), and light of a wavelength other than the specific wavelength $\lambda_K$ is outputted from the second output port 25b.

By way of a process such as that described hereinabove, an optical wavelength filter 21 of the first embodiment splits or demultiplexes light of a specific wavelength $\lambda_K$ from WDM light $\lambda_1-\lambda_N$.

Here, after being subjected to mode conversion in the mode converter 27, a wavelength $\lambda_T$ of light outputted from the first output port of the second optical coupler 25 can be guided as follows. That is, with regard to zero-order mode light and first-order mode light of wavelength $\lambda_T$, which propagates through the mode converter 27, if the wave number vectors are expressed as $k_o$ and $k_E$, and the equivalent refractive indices are expressed as $n_o$ and $n_E$, relational expressions (1) and (2), which are expressed therebetween as $$k_o = 2\pi n_o / \lambda_T \tag{1}$$

$$k_E = 2\pi n_E / \lambda_T \tag{2}$$

are realized. Further, if the spacing of the diffraction gratings is expressed as $\Lambda$, relational expression (3), which is expressed as $$K = 2\pi/\Lambda \tag{3}$$

is realized. Further, based on phase matching conditions, it is necessary to satisfy relational expression (4), which is expressed as $$|k_E - k_o| = K \tag{4}$$

Accordingly, from the above-mentioned expressions (1)–(4), wavelength $\lambda_T$, which is subjected to mode conversion in the mode converter 27 and outputted from the first output port, can be expressed by relational expression (5) as $$\lambda_T = \Lambda X |n_E - n_o| \tag{5}$$

Therefore, the same as with the prior art, this gives rise to a difference of mode orders between zero-order/first-order modes of light, and the wave number vectors (propagation constants) of both will differ. However, according to the present invention, because wavelength division demultiplexing is carried out using mode conversion between zero-order/first-order modes of light, the wavelength of light outputted from the first output port, as expressed by Expression (5), constitutes a single wavelength dependent on two modes without there being independent values for each mode.

Furthermore, in the embodiment explained hereinabove, the mode converter 27, for example, has a transmission-type diffraction grating, and transmits both mode-converted light, which has been subjected to mode conversion, and non-mode-converted light, which has not been subjected to mode conversion. However, the present invention is not limited to this kind of aspect, and the mode converter 27 can have a reflection-type diffraction grating, and can be constituted so as to reflect light of a specific wavelength.

In a case in which a mode converter 27 of this kind reflects light of a specific wavelength, due to phase matching conditions, it is necessary to satisfy relational expression (6), which is expressed as $$k_E + k_o = K \tag{6}$$

Accordingly, based on the above-mentioned Expressions (1)–(3), and Expression (6), the wavelength $\lambda_K$ reflected in the mode converter 27 can be expressed by relational expression (7) as $$\lambda_K = \Lambda X (n_E + n_o) \tag{7}$$

Therefore, in a case in which light is reflected by a mode converter 27 as well, the reflected wavelength can be a single value that is not dependent on mode without there being an independent value for each mode.

Conversely, in wavelength selection by a reflection-type diffraction grating in the conventional constitution disclosed in Document I, since light is being reflected between a zero-order mode and between a first-order mode, respectively, the reflected wavelength for an even mode $\lambda_{EE}$ and the reflected wavelength for an odd mode $\lambda_{KO}$ are expressed by the relational expressions $$\lambda_{EE} = 2\Lambda X \, n_E \text{ and } \lambda_{KO} = 2\Lambda X \, n_o \tag{8}$$

Accordingly, in the conventional constitution, the reflected wavelengths in the even mode and odd mode differ from one another (that is, $\lambda_{EE} \neq \lambda_{KO}$), and, thus, output light having a double peak in the vicinity of a specific wavelength is generated.

As explained hereinabove, according to the optical wavelength filter 21 of the first embodiment of the present invention, because a specific wavelength is being selected while mode conversion is being carried out between a zero-order mode and a first-order mode, it is possible to prevent the generation of a double peak.

Figure 4:
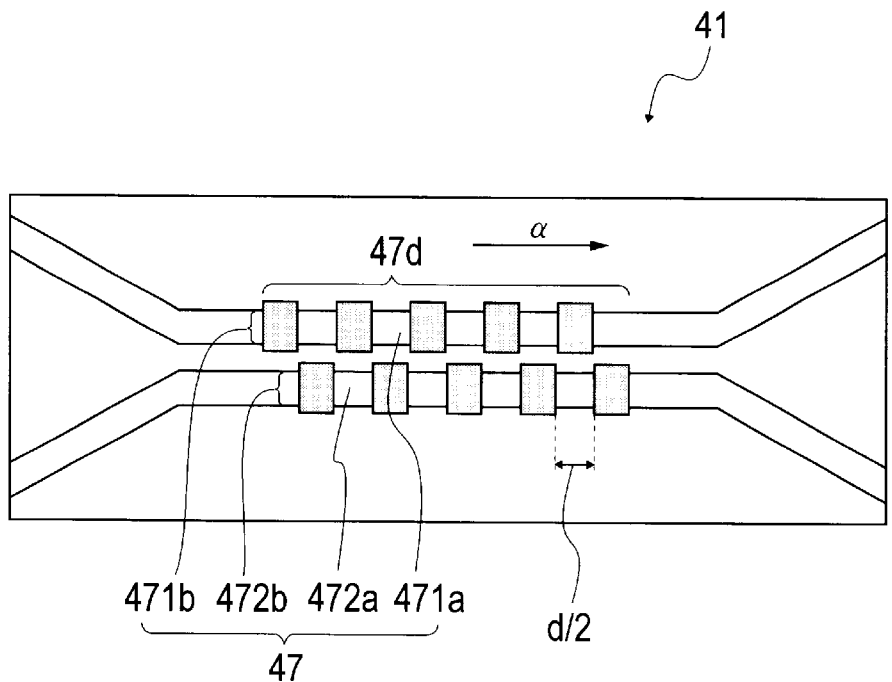
FIG. 4 is a diagram showing an example of another constitution of a 2-mode optical wavelength filter according to a first embodiment of the present invention.

Furthermore, FIG. 4 is a diagram showing an example of another constitution of a 2-mode optical wavelength filter.

The optical wavelength filter 41 shown in FIG. 4 can be made to function in the same way as the optical wavelength filter 21 of the first embodiment. The optical wavelength filter 41 shown in FIG. 4 has a mode converter 47 of a constitution, which differs from that of FIG. 2, that is, a mode converter 47 having two single-mode waveguides arranged in parallel.

The mode converter 47 of FIG. 4 has two single-mode waveguides 471a and 472a arranged in parallel, and two rows of diffraction gratings 471b and 472b. These gratings 471b and 472b are provided in the single-mode waveguides 471a and 472a, respectively, so as to form a periodic structure along the optical waveguiding direction α in each single-mode waveguide 471a and 472a, and to extend the rows of the gratings in parallel while mutually staggering the rows by a half period. As a whole, the mode converter 47 has a structure, which imparts a refractive index distribution of a zigzag grating shape to an optical coupling region 47d formed by the two single-mode waveguides 471a and 472a. As to a 2-mode system like that in the first embodiment, a mode converter 47 such as mentioned above can also be utilized.

Second Embodiment

Figure 5:
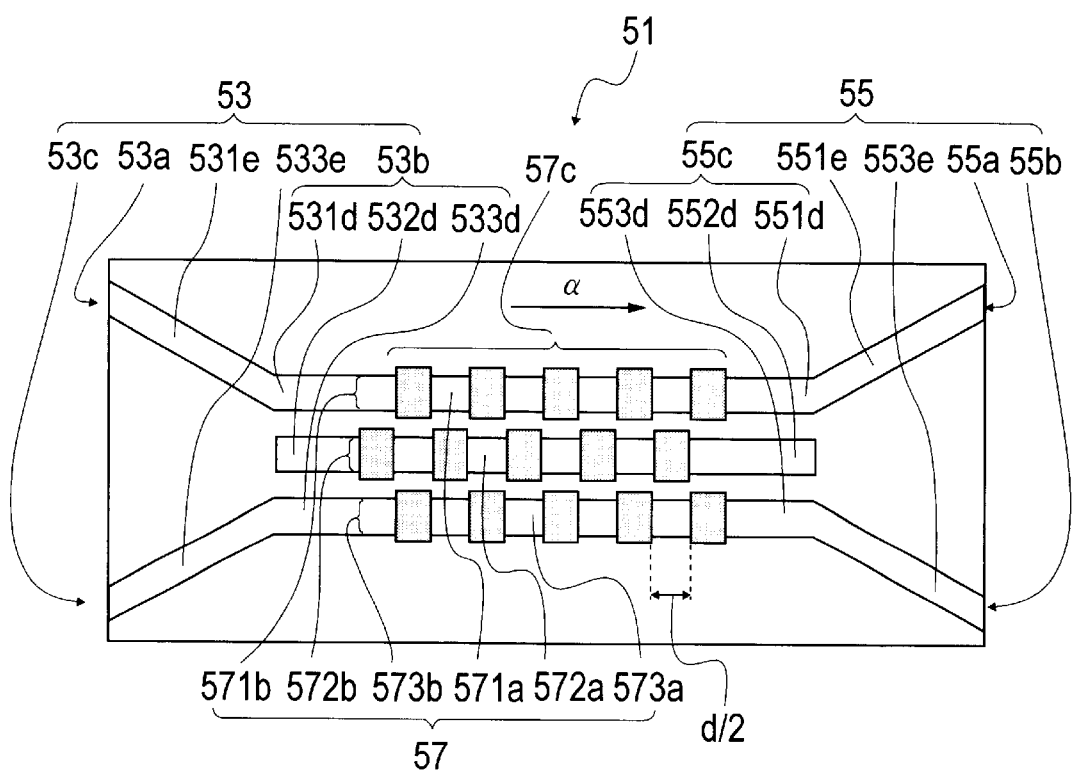
FIG. 5 is a diagram showing a second embodiment according to an optical wavelength filter of the present invention, and more particularly, is a diagram showing a simplified constitution of a 3-mode optical wavelength filter.

FIG. 5 is an example of one constitution of an optical wavelength filter of FIG. 1, and is a diagram showing a simplified constitution of an optical wavelength filter of a second embodiment. FIG. 5 shows one aspect of a 3-mode optical wavelength filter, which uses a zero-order mode light, a first-order mode light and a second-order mode light.

As shown in FIG. 5, the optical wavelength filter 51 comprises a first optical coupler 53, a second optical coupler 55 similar to the first optical coupler 53, and a mode converter 57. However, the mode converter 57 of the second embodiment is constituted from three single-mode waveguides placed side by side.

The first optical coupler 53 has a first input port 53a for inputting wavelength division multiplexing. (WDM) light (or optical signals) thereto, and a first optical coupling region 53b for exciting zero-order, first-order and second-order modes of light of WDM light inputted from the first input port 53a. The first optical coupling region 53b has a function for providing a phase difference of ±π/2+2mπ (where m is an integer) between a plurality of modes of light constituting the light of each wavelength. More specifically, the first optical coupler 53 is constituted from three single-mode waveguides 531d, 532d and 533d, which form the first optical coupling region 53b, and two branching waveguides (single-mode waveguides) 531e and 533e, which are smoothly connected to each of the separated single-mode waveguides 531d and 533d among three waveguides 531d, 532d and 533d. The branching waveguides 531e and 533e have a symmetrical Y branching structure. Furthermore, the first optical coupler 53 can also have a dummy port 53c as in the example shown in the FIG. 5.

Further, the second optical coupler 55 has a first output port 55a, a second output port 55b, and a second optical coupling region 55c, which is capable of propagating multiple modes of light of the same orders (zero-order, first-order and second-order) as the multiple modes of light generated by the first optical coupler 53. The second optical coupling region 55c has functions for further providing a phase difference of ±π/2+2nπ (where n is an integer) between the modes of light outputted from the mode converter 57, and in accordance therewith, light of a specific wavelength is outputted from, for example, the first output port 55a, while outputting other light from, for example, the second output port 55b. More specifically, the second optical coupler 55 is constituted from three single-mode waveguides 551d, 552d and 553d, which form the second optical coupling region 55c, and two branching waveguides (single-mode waveguides) 551e and 553e, which are smoothly connected to each of the separated single-mode waveguides 551d and 553d, and have a symmetrical Y branching structure.

The mode converter 57 performs mode conversion, while maintaining the phase differences between modes of light of the plurality of modes of light outputted from the first optical coupler 53 in the state outputted from the first optical coupler 53.

Further, as shown in FIG. 5, when constituted from a plurality of single mode waveguides arranged in rows, the mode converter 57 has three single-mode waveguides 571a, 572a, 573a arranged in parallel, and three rows of diffraction gratings 571b, 572b, 573b. These gratings 571b, 572b and 573b are provided in the respective single-mode waveguides 571a, 572a, 573a so as to form periodic structures along the optical waveguiding direction α in the three single-mode waveguides 571a, 572a, 573a, and such that the rows extend in parallel while being mutually staggered by a half period d/2. As a whole, the mode converter 57 has a structure, which imparts a refractive index distribution of a zigzag grating shape to the optical coupling region 57c formed by the three single-mode waveguides 571a, 572a, 573a.

As shown in FIG. 5, according to the optical wavelength filter 51, the first optical coupling region 53b is constituted from single-mode waveguides 531d, 532d and 533d, respectively, and the second optical coupling region 55c is constituted from single-mode waveguides 551d, 552d and 553d, respectively. These single-mode waveguides are each linked to a different single-mode waveguide 571a, 572a and 573a of the mode converter 57, and each have the same waveguide sectional structure. Therefore, these connected single-mode waveguide groups (that is, a group of 531d, 551d and 571a, a group of 532d, 552d and 572a, and a group of 533d, 553d and 573a) are each ordinarily formed together as a single waveguide.

Furthermore, the diffraction gratings 571b, 572b, 573b of the mode converter 57 can be either a refractive index modulation-type or a relief-type configuration, but when formed as a relief-type, it is desirable that each single-mode waveguide (group of 531d, 551d and 571a and others) may be formed via the same process. Further, mode conversion can be performed in the mode converter 57 by either an electro-optical effect or an acousto-optical effect.

Here, the operation and specific functions of this optical wavelength filter 51 will be explained by referring to FIG. 5, FIG. 6 and FIG. 7.

FIG. 6 is a diagram schematically showing each mode of a 3-mode optical wavelength filter, and FIG. 7 is a diagram schematically showing the phase difference of each mode in each part of a 3-mode optical wavelength filter. However, the state of each mode light shown in FIG. 6(A) shows an initial phase state similar to that shown in FIG. 7(A), and FIGS. 7(B)–7(F) show states (sequence of the large white arrows), in which phasing planes having FIG. 7(A) as an initial state rotate within a complex plane. Reference characters m0, m1 and m2 represent phases of a zero-order mode light, a first-order mode light and a second-order mode light, respectively. Furthermore, here, too, it is supposed that the phase difference between modes of light is substituted in a range from −π to π in accordance with a periodicity of 2π for each mode light.

It is supposed that wavelength division multiplexing (WDM) light (optical signals) $\lambda_1$–$\lambda_N$ has entered the first input port 53a of the optical wavelength filter 51 shown in FIG. 5. The WDM light is excited by the first optical coupler 53 to generate modes of light.

Figure 7A:
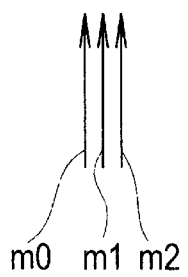
FIG. 7 is diagrams schematically showing the phase difference between the modes of light in each portion in a 3-mode optical wavelength filter according to a second embodiment of the present invention.

As shown in FIG. 6(A) and FIG. 7(A), light entering the first input port 53a of the first optical coupler 53 is propagated as a zero-order mode light m0, a first-order mode light m1 and a second-order mode light m2 inside the first optical coupling region 53b.

Here, the coupling length of the first optical coupling region 53b is set beforehand such that a respective phase difference of $\pi/2$ occurs at the output end face of the first optical coupler 53 between the zero-order mode light m0 and first-order mode light m1, and between the first-order mode light m1 and second-order mode light m2 of the light of each wavelength $\lambda_1$–$\lambda_N$.

Figure 7B:
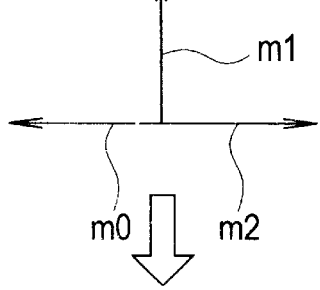

Thus, as shown in FIG. 7(B), a phase difference of $\pi/2$ is granted to the light outputted from the first optical coupler 53, that is, between each of the zero-order mode light m0, first-order mode light m1 and second-order mode light m2 that constitute the light of each wavelength $\lambda_1$–$\lambda_N$. In other words, in a 3-mode system, the light of each of wavelengths $\lambda_1$–$\lambda_N$ included in WDM light is outputted from the first optical coupler 53 in a state having a phase difference of $\pi/2$ between each zero-order mode light m0 and first-order mode light m1, and having a phase difference of $\pi/2$ between each first-order mode light m1 and second-order mode light m2.

When light outputted from the first optical coupler 53 is inputted to the mode converter 57, mode conversion is performed between specific modes of light of a specific wavelength $\lambda_K$ (provided K is 1–n) from among the WDM light including light of wavelengths $\lambda_1$–$\lambda_N$, in accordance with the structure of the diffraction gratings 571b, 572b and 573b of the mode converter 57.

Figure 7D:
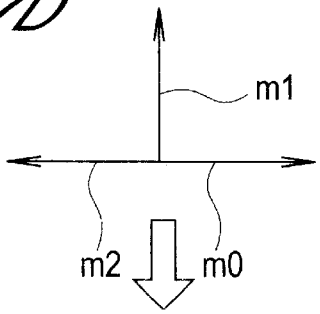

The mode converter 57 is constituted such that mode conversion only occurs between specific modes of light belonging to a specific wavelength $\lambda_K$ of light from among the WDM light including light of wavelengths $\lambda_1$–$\lambda_N$ (in this embodiment, which is a 3-mode system, particularly between a zero-order mode light and a second-order mode light of specific wavelength $\lambda_K$ of light). Consequently, the zero-order mode light and second-order mode light belonging to a specific wavelength $\lambda_K$ are subjected to mode conversion when propagating through the mode converter 57, and are outputted from the output end face of the mode converter 57 in a state, wherein they have a phase difference of $\pi/2$ and $-\pi/2$, respectively, as shown in FIG. 7(D). In other words, in a 3-mode system, the light of a specific wavelength $\lambda_K$ is outputted from the mode converter 57 in a state, having a phase difference of $-\pi/2$ between zero-order mode light m0 and first-order mode light m1, and having a phase difference of $-\pi/2$ between first-order mode light m1 and second-order mode light m2.

Figure 7F:
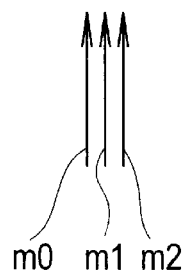
Figure 7C:
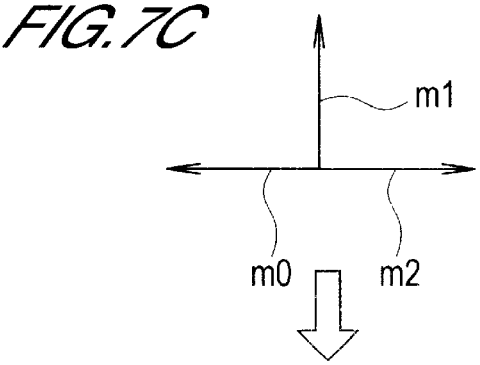

Conversely, light, which does not undergo mode conversion (here, modes of light other than zero-order mode light and second-order mode light of wavelength $\lambda_K$), propagates through the mode converter 57 without undergoing mode conversion, and, as shown in FIG. 7(C), is outputted maintaining as-is the phase difference of the input end face of the mode converter 57. That is, light of each wavelength $\lambda_1$–$\lambda_N$ excluding the specific wavelength $\lambda_K$, is outputted from the mode converter 57 in a state having a phase difference of $\pi/2$ between zero-order mode light m0 and first-order mode light m1, and having a phase difference of $\pi/2$ between first-order mode light m1 and second-order mode light m2.

Light outputted from the mode converter 57, enters the second optical coupler 55, and then propagates through the second optical coupling region 55c of the second optical coupler 55, and thereafter, is outputted from the output end face of the second optical coupler 55, that is, from the first output port 55a and second output port 55b. That is, at the first output port 55a and the second output port 55b, a phase difference of $\pi/2$ is further granted between each of the zero-order mode light m0, first-order mode light m1 and second-order mode light m2 constituting the light of each wavelength $\lambda_1$–$\lambda_N$. In other words, in a 3-mode system, a phase difference of $\pi/2$ is further granted between each zero-order mode light m0 and first-order mode light m1, and between each first-order mode light m1 and second-order mode light m2 of light of WDM light of wavelengths $\lambda_1$–$\lambda_N$.

Therefore, the light of a specific wavelength $\lambda_K$ reaches the output end face of the second optical coupler 55 in a state, which does not have a phase difference between the zero-order mode light m0, first-order mode light m1 and second-order mode light m2, as shown in FIG. 6(B) and FIG. 7(F).

Figure 7E:
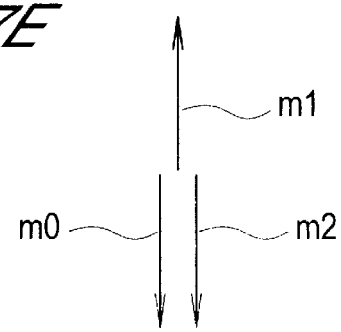

Conversely, light of wavelengths other than the specific wavelength $\lambda_K$ reaches the output end face of the second optical coupler 55 in a state having a phase difference of $\pi$ between a zero-order mode light m0 and first-order mode light m1, and having a phase difference of $\pi$ between a first-order mode light m1 and second-order mode light m2 as shown in FIG. 7(E).

Therefore, the waveform of light of a specific wavelength $\lambda_K$ expressed as the sum of each mode light m0, m1 and m2 constituting the specific wavelength $\lambda_K$ at the output end face of the second optical coupler 55, as shown in FIG. 6(B) and FIG. 7(F), has a peak in the first output port 55a side, and the light of the specific wavelength $\lambda_K$ is outputted from the first output port 55a. Further, because the waveform of light of wavelengths other than a specific wavelength $\lambda_K$ selected from among WDM light including light of wavelengths $\lambda_1$–$\lambda_N$ is expressed as the sum of modes of light m0, m1 and m2 as shown in FIG. 7(E), the light of a wavelength other than the specific wavelength $\lambda_K$ is outputted from the second output port 55b.

As explained hereinabove, according to the optical wavelength filter 51 of the second embodiment, the selection of a specific wavelength is carried out while performing mode conversion between a zero-order mode light and second-order mode light, and accordingly it is possible to prevent the generation of double peaks.

Further, in this second embodiment, the optical wavelength filter 51 is constituted by a 3-mode system, and in accordance therewith, because light of a wavelength adjacent to a specific wavelength is outputted from a portion residing between a first output port 55a and a second output port 55b (that is, from a single-mode waveguide 552d of the center of the second optical coupler 55), there is the advantage of being able to decrease crosstalk light.

Furthermore, the mode converter 57 has a transmission-type diffraction grating the same as in the case of the first embodiment, and both mode-converted light, which has been subjected to mode conversion, and non-mode-converted light, which has not been subjected to mode conversion, are transmitted, but this mode converter 57 can be constituted so as to have a reflection-type diffraction grating, and to reflect the light of a specific wavelength.

Figure 8:
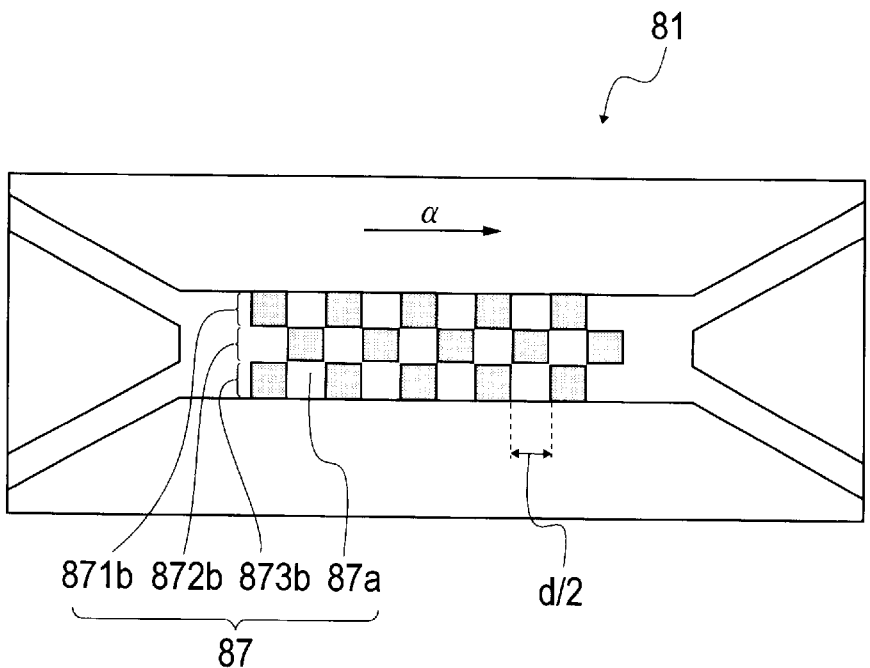
FIG. 8 is a diagram showing an example of another constitution of a 3-mode optical wavelength filter according to a second embodiment of the present invention.

Further, the optical wavelength filter 81 shown in FIG. 8 can be made to function the same as the optical wavelength filter 51 of this second embodiment. FIG. 8 is a diagram showing an example of another constitution of a 3-mode optical wavelength filter. The optical wavelength filter 81 shown in FIG. 8 has a mode converter 87 of a constitution that differs from that of FIG. 5, that is, it has one multimode waveguide.

The mode converter 87 of FIG. 8 has one multimode waveguide 87a capable of exciting three modes, and three rows of diffraction gratings 871b, 872b and 873b, which are disposed in the multimode waveguide 87a so as to form a periodic structure along the optical wave guiding direction a and such that the rows are arranged in parallel while being mutually staggered by a half period. As a whole, the mode converter 87 has a structure, which imparts a refractive index distribution of a zigzag grating shape to the multimode waveguide 87a. A mode converter 87 such as described above can also be utilized in a 3-mode system like that of the second embodiment.

Furthermore, the optical wavelength filters of each embodiment explained hereinabove are not limited to a 2-mode system and 3-mode system such as those of the first and second embodiments, but rather can also make use of either a 4-mode system or higher modes. In the case of a 4-mode system, the present invention can be constituted as in a third embodiment described hereinbelow.

Third Embodiment

Figure 9:
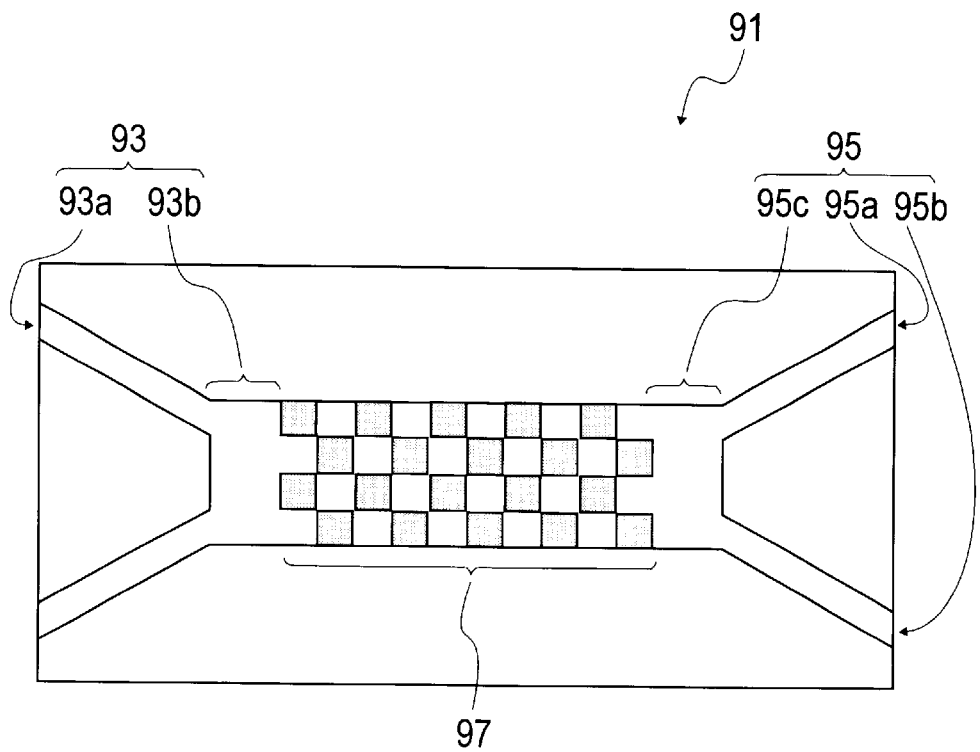
FIG. 9 is a diagram showing a third embodiment of an optical wavelength filter according to the present invention, and more particularly, is a diagram showing a simplified constitution of a 4-mode optical wavelength filter (the one that performs conversion between odd modes)
Figure 10:
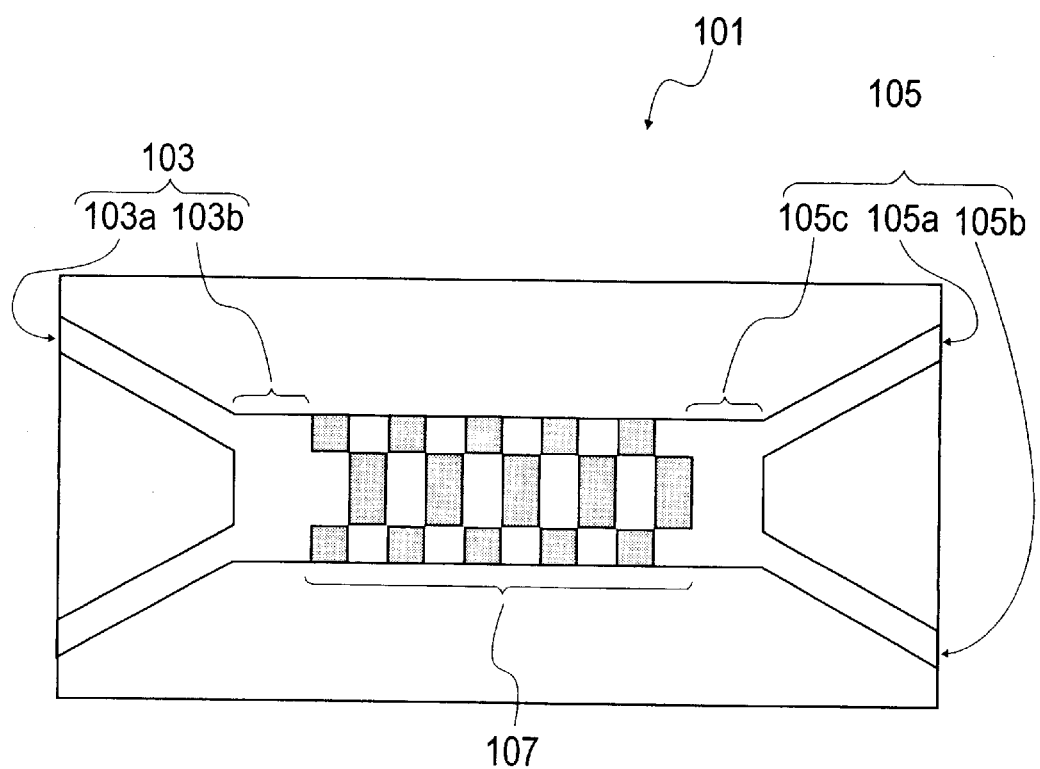
FIG. 10 is a diagram showing a simplified constitution of a 4-mode optical wavelength filter (the one that performs conversion between even modes) according to a third embodiment of the present invention.

FIG. 9 and FIG. 10 are diagrams showing examples of constitutions of 4-mode optical wavelength filters of a third embodiment. However, FIG. 9 shows an optical wavelength filter for converting between odd modes of light, and FIG. 10 shows an optical wavelength filter for converting between even modes of light.

Figure 11:
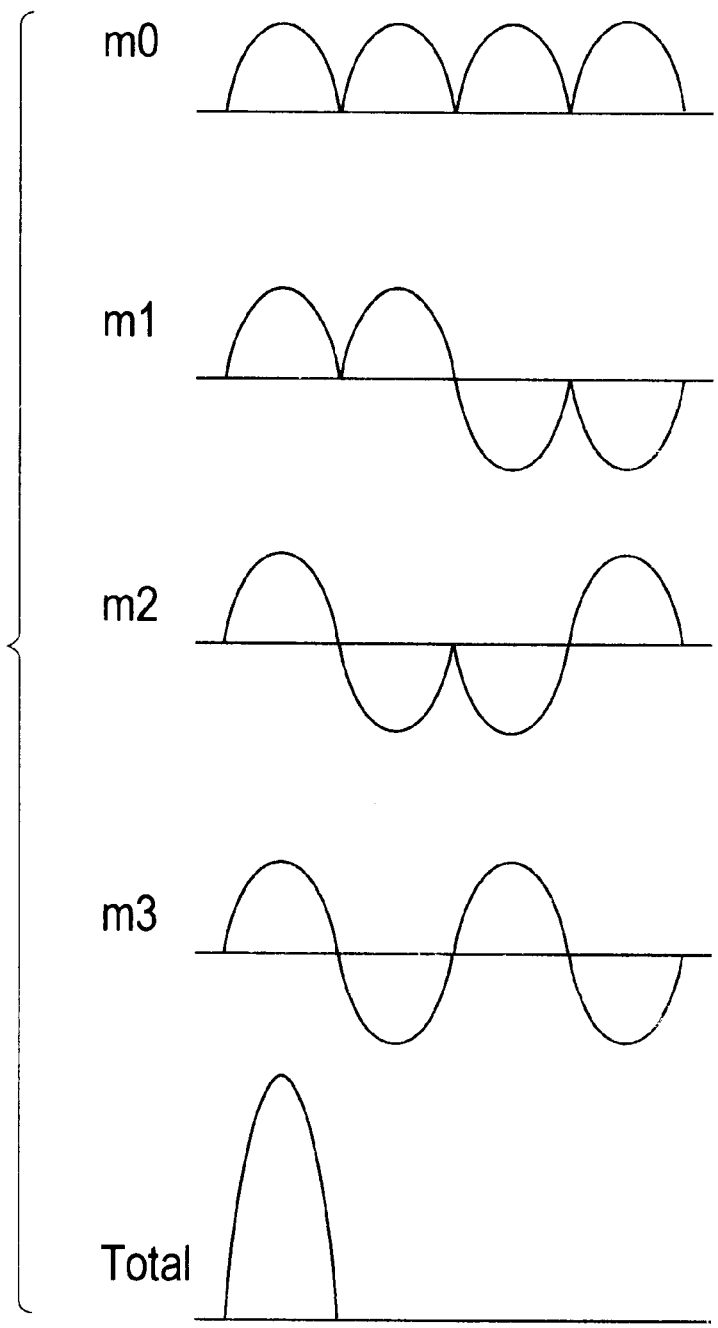
FIG. 11 is diagrams schematically showing each mode of a 4-mode optical wavelength filter according to a third embodiment of the present invention.
Figure 13A:
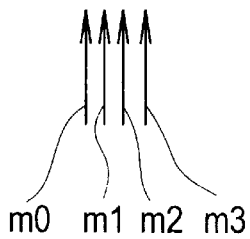
FIG. 13 is diagrams schematically showing the phase difference between the modes of light in each portion in a 4-mode optical wavelength filter (even mode conversion) according to a third embodiment of the present invention.
Figure 13B:
Figure 13D:
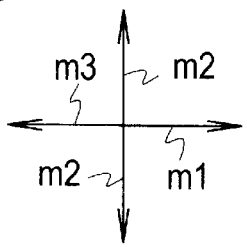
Figure 13F:
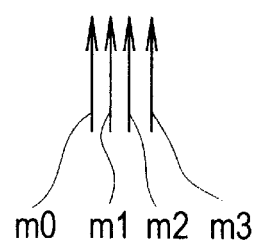
Figure 13C:
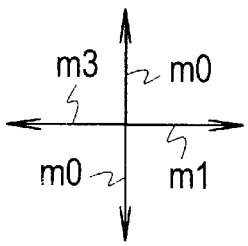
Figure 13E:
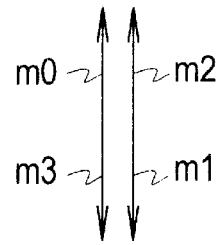

Further, FIG. 11 is a diagram schematically showing each mode of an optical wavelength filter in a 4-mode system, and FIG. 12 is a diagram schematically showing the phase differences between the modes of light in each part or portion of an optical wavelength filter of a 4-mode system (provided it is a case in which conversion is performed between odd modes of light). FIG. 13 is a diagram schematically showing the phase differences between the modes of light in each part or portion of an optical wavelength filter of a 4-mode system (provided it is a case in which conversion is performed between even modes of light). However, the state of each mode light of FIG. 11 shows an initial phase state similar to those of FIG. 12(A) and FIG. 13(A), and FIGS. 12(B)–12(F) show states (sequence of the large white arrows), in which phasing planes having the state shown in FIG. 12(A) as an initial state rotate within a complex plane. FIGS. 13(B)–13(F) show states (sequence of the large white arrows), in which phasing planes having the state shown in FIG. 13(A) as an initial state rotate within a complex plane. In the figures, m0, m1 m2 and m3 represent the phase of a zero-order mode light, a first-order mode light, a second-order mode light and a third-order mode light, respectively. Furthermore, here, it is supposed that the phase difference between modes of light is substituted in a range from $-\pi$ to $\pi$ in accordance with a periodicity of $2\pi$ for each mode of light.

In the optical wavelength filter 91 of FIG. 9, as shown in FIG. 11 and FIG. 12(A), a zero-order mode light m1, a first-order mode light m1, a second-order mode light m2 and a third-order mode light m3 are inputted to a first input port 93a of a first optical coupler 93 in a state of phase difference 0, and propagate through a first optical coupling region 93b.

A phase difference of $\pi/2$ is granted, as shown in FIG. 12(B), to the light outputted from the first optical coupler 93, that is, between each of the zero-order mode light m0, first-order mode light m1, second-order mode light m2 and third-order mode light m3 that constitute the light of each wavelength $\lambda_1$–$\lambda_N$. In other words, in a 4-mode system, the light of WDM light including light of wavelengths $\lambda_1$–$\lambda_N$ is outputted from the first optical coupler 93 in a state having a phase difference of $\pi/2$ between each zero-order mode light m0 and first-order mode m1, having a phase difference of $\pi/2$ between each first-order mode light m1 and second-order mode light m2, and having a phase difference of $\pi/2$ between each second-order mode light m2 and third-order mode light m3.

A first-order mode light m1 and a third-order mode light m3 of a specific wavelength $\lambda_K$ are subjected to mode conversion when propagating through the mode converter 97, and are outputted from the output end face of the mode converter 97 in a state, wherein they have a phase difference of $\pi/2$ and $-\pi/2$, respectively, as shown in FIG. 12(D). In other words, in a 4-mode system, the light of a specific wavelength $\lambda_K$ is outputted from the mode converter 97 in a state, having a phase difference of $-\pi/2$ between zero-order mode light m0 and first-order mode light m1, and having a phase difference of $-\pi/2$ between first-order mode light m1 and second-order mode light m2, and having a phase difference of $-\pi/2$ between second-order mode light m2 and third-order mode light m3.

Conversely, light, which does not undergo mode conversion, propagates through the mode converter 97 without undergoing mode conversion, and, as shown in FIG. 12(C), is outputted maintaining as-is the phase difference of the input end face of the mode converter 97. That is, light of each wavelength $\lambda_1$–$\lambda_N$ excluding a specific wavelength $\lambda_K$ is outputted from the mode converter 97 in a state having a phase difference of $\pi/2$ between zero-order mode light m0 and first-order mode light m1, and having a phase difference of $\pi/2$ between each first-order mode light m1 and second-order mode light m2, and having a phase difference of $\pi/2$ between each second-order mode light m2 and third-order mode light m3.

Light outputted from the mode converter 97, enters the second optical coupler 95, and then propagates through the second optical coupling region 95c of the second optical coupler 95, and thereafter, is outputted from the output end face of the second optical coupler 95, that is, from the first output port 95a and second output port 95b. That is, in the first output port 95a and the second output port 95b, a phase difference of $\pi/2$ is further granted between each of the zero-order mode light m0, first-order mode light m1, second-order mode light m2 and third-order mode light m3 constituting the light of each wavelength $\lambda_1$–$\lambda_N$. In other words, in a 4-mode system, a phase difference of $\pi/2$ is further granted between each zero-order mode light m0 and first-order m1, a phase difference of $\pi/2$ is further granted between each first-order mode light m1 and second-order light m2, and a phase difference of $\pi/2$ is further granted between each second-order mode light m2 third-order mode light m3, of light of WDM light including light of wavelengths $\lambda_1$–$\lambda_N$.

Therefore, the light of a specific wavelength $\lambda_K$ reaches the output end face of the second optical coupler 95 in a state, which does not have a phase difference between the zero-order mode light m0, first-order mode light m1, second-order mode light m2 and third-order mode light m3, as shown in FIG. 12(F).

Conversely, light other than a specific wavelength $\lambda_K$ reaches the output end face of the second optical coupler 95 in a state, wherein a zero-order mode light m0 and second-order mode light m2 are the same phase, a first-order mode light m1 and third-order mode light m3 are the same phase, and a zero-order mode light m0 and second-order mode light m2, and a first-order mode light m1 and third-order mode light m3 have a phase difference of π as shown in FIG. 12(E).

Therefore, the waveform of light of a specific wavelength $\lambda_K$ expressed as the sum of modes of light m0, m1, m2 and m3 constituting light of the specific wavelength $\lambda_K$ at the output end face of the second optical coupler 95, as shown in FIG. 12(F), has a peak in the first output port 95a side, and the light of the specific wavelength $\lambda_K$ is outputted from the first output port 95a. Further, because the waveform of light of wavelengths other than a specific wavelength $\lambda_K$ from among WDM light including light of wavelengths $\lambda_1-\lambda_N$ is expressed as the sum of modes of light m0, m1, m2 and m3 as shown in FIG. 12(E), light of a wavelength other than the specific wavelength $\lambda_K$ is outputted from the second output port 95b.

Further, in the case of optical wavelength filter 101 of FIG. 10, the mode converter 107 performs mode conversion between even modes of light, that is, between a zero-order mode light m0 and a second-order mode light m2, as shown in FIG. 11. In this case, the same as the optical wavelength filter of FIG. 9, in the optical wavelength filter 101 of FIG. 10, light of a specific wavelength $\lambda_K$ is outputted from a first output port 105a, and light of a wavelength other than a specific wavelength $\lambda_K$ is outputted from the second output port 105b.

As explained hereinabove, according to either optical wavelength filter 91 or 101, because the selection of a specific wavelength is carried out while performing mode conversion either between a first-order mode light and third-order mode light, or between a zero-order mode light and second-order mode light, it is possible to prevent the generation of double peaks.

In this third embodiment, the optical wavelength filter 91 (or 101) is constituted from a 4-mode system, and in accordance therewith, because light of a wavelength adjacent to a specific wavelength is outputted from between either first output port 95a or 105a and either second output port 95b or 105b, there is the advantage of being able to decrease crosstalk light.

Furthermore, either mode converter 97 or 107 has a transmission-type diffraction grating the same as in the case of the first embodiment, and both mode-converted light, which has been subjected to mode conversion, and non-mode-converted light, which has not been subjected to mode conversion, are transmitted, but this mode converter 97 or 107 can be constituted so as to have a reflection-type diffraction grating, and to reflect the light of a specific wavelength. Further, either the optical wavelength filter 97 or 107 can be constituted by utilizing a plurality of single-mode waveguides lined up side-by-side in the same way as the first embodiment.

Further, it goes without saying that if the elements constituting an optical wavelength filter of either each of the embodiments, or the examples of other constitutions explained hereinabove fall within the concept of the present invention, it is possible to arbitrarily alter the present invention in accordance with a design.

As is clear from the above explanations, according to the present invention, multiple modes of light are generated for each wavelength of WDM light comprising light of a plurality of wavelengths, and mode conversion is performed between modes of different orders of light constituting light of a specific wavelength. A phase difference between the modes of light constituting light of a specific wavelength, and a phase difference between the modes of light constituting light of another wavelength can be independently adjusted. Accordingly, it is possible to output only light of a specific wavelength from an output port, and to output light of another wavelength from another output port. Further, because mode conversion is performed between modes of light constituting light of a specific wavelength, the generation of a double peak can be suppressed without depending on a difference of propagation constants of each mode of light belonging to a specific wavelength.

What is claimed is:

1. An optical wavelength filter, comprising:

first and second optical couplers for propagating wavelength division multiplexing (WDM) light comprising a plurality of wavelengths, exciting multiple modes of light comprising high-order modes of light for light of each wavelength of said WDM light, and providing a predetermined phase difference between different modes of light of said multiple modes of light; and a mode converter, which is arranged between said first and second optical couplers, and which performs mode conversion between different-order modes of light belonging to a selected specific wavelength of light from among said multiple modes of light excited by said optical couplers, wherein said mode converter comprises a multimode waveguide, and a plurality of rows of diffraction gratings which are arranged in said multimode waveguide so as to form a periodic structure along in optical wave guiding direction in said multimode waveguide, the rows of diffraction gratings extending in parallel with respect to each other while being mutually staggered by a half period.

2. An optical wavelength filter according to claim 1, wherein:

said first optical coupler having a first input port for inputting said WDM light thereto, and a first optical coupling region for exciting said multiple modes of light of said WDM light inputted from said first input port, said first optical coupling region providing a phase difference of substantially ±π/2 between modes of light constituting the light of said each wavelength;

said mode converter performing said mode conversion while generally maintaining the phase difference between respective modes of light outputted from said first optical coupler; and said second optical coupler having a second optical coupling region for enabling the propagation of said multiple modes of light, a first output port and a second output port, said second optical coupling region providing a phase difference of substantially ±π/2 between the modes of light constituting the light of each wavelength outputted from said mode converter, to thereby output light of said specific wavelength and light of other wavelengths from either said first output port or said second output port, which differ from one another.

3. An optical wavelength filter according to claim 1, wherein said first and second optical couplers comprise branching waveguides having symmetrical branching structures.

4. An optical wavelength filter according to claim 1, wherein said multiple modes of light excited by said first and second optical couplers are made zero- and first-order modes of light, and wherein said mode converter, carries out mode conversion between said zero-order modes of light and said first-order modes of light belonging to said light of the specific wavelength.

5. The optical wavelength filter according to claim 1, wherein said multiple modes of light excited by said first and second optical couplers are made zero-, first- and second-order modes, and, in mode conversion by said mode converter, are converted between zero-order modes and second-order modes constituting said specific wavelength.

6. An optical wavelength filter according to claim 1, wherein said multiple modes of light excited by said first and second optical couplers are made zero-, first-, second- and third-order modes of light, and wherein said mode converter carries out mode conversion either between zero-order modes of light and second-order modes of light, or between first-order modes of light and third-order modes of light belonging to said light of the specific wavelength.

7. An optical wavelength filter, comprising:

first and second optical couplers for propagating wavelength division multiplexing (WDM) light comprising a plurality of wavelengths, exciting multiple modes of light comprising high-order modes of light for light of each wavelength of said WDM light, and providing a predetermined phase difference between different modes of light of said multiple modes of light; and a mode converter, which is arranged between said first and second optical couplers, and which performs mode conversion between different-order modes of light belonging to a selected specific wavelength of light from among said multiple modes of light excited by said optical couplers, wherein said mode converter comprises a plurality of single-mode waveguides arranged in parallel, and a plurality of rows of diffraction gratings which are respectively arranged in the single-mode waveguides so as to form a periodic structure along an optical wave guiding direction in the single-mode waveguides, and so as to be mutually shifted by a half period from one another.

8. An optical wavelength filter according to claim 7, wherein:

said first optical coupler having a first input port for inputting said WDM light thereto, and a first optical coupling region for exciting said multiple modes of light of said WDM light inputted from said first input port, said first optical coupling region providing a phase difference of substantially $\pm\pi/2$ between modes of light constituting the light of said each wavelength;

said mode converter performing said mode conversion while generally maintaining the phase difference between respective modes of light outputted from said first optical coupler; and said second optical coupler having a second optical coupling region for enabling the propagation of said multiple modes of light, a first output port and a second output port, said second optical coupling region providing a phase difference of substantially $\pm\pi/2$ between the modes of light constituting the light of each wavelength outputted from said mode converter, to thereby output light of said specific wavelength and light of other wavelengths from either said first output port or said second output port, which differ from one another.

9. An optical wavelength filter according to claim 7, wherein said first and second optical couplers comprise branching waveguides having symmetrical branching structures.

10. An optical wavelength filter according to claim 7 wherein said multiple modes of light excited by said first and second optical couplers are made zero- and first-order modes of light, and Wherein said mode converter, carries out mode conversion between said zero-order modes of light and said first-order modes of light belonging to said light of the specific wavelength.

11. The optical wavelength filter according to claim 7 wherein said multiple modes of light excited by said first and second optical couplers are made zero-, first- and second-order modes, and, in mode conversion by said mode converter, are converted between zero-order modes and second-order modes constituting said specific wavelength.

12. An optical wavelength filter according to claim 7 wherein said multiple modes of light excited by said first and second optical couplers are made zero-, first-, second- and third-order modes of light, and wherein said mode converter carries out mode conversion either between zero-order modes of light and second-order modes of light, or between first-order modes of light and third-order modes of light belonging to said light of the specific wavelength.

* * * * *